United States Patent
Ichimura et al.

(10) Patent No.: US 10,822,526 B2
(45) Date of Patent: Nov. 3, 2020

(54) ADHESIVE RESIN PELLETS AND METHOD OF MANUFACTURING SAME

(71) Applicant: NICHIBAN CO., LTD., Tokyo (JP)

(72) Inventors: Syuji Ichimura, Tokyo (JP); Mikihiro Endou, Tokyo (JP); Yusuke Sugiyama, Tokyo (JP)

(73) Assignee: Nichiban Co., Ltd., Tokyo (JP)

( * ) Notice: Subject to any disclaimer, the term of this patent is extended or adjusted under 35 U.S.C. 154(b) by 129 days.

(21) Appl. No.: 15/561,148

(22) PCT Filed: Dec. 18, 2015

(86) PCT No.: PCT/JP2015/085525
§ 371 (c)(1),
(2) Date: Sep. 25, 2017

(87) PCT Pub. No.: WO2016/157644
PCT Pub. Date: Oct. 6, 2016

(65) Prior Publication Data
US 2018/0104855 A1    Apr. 19, 2018

(30) Foreign Application Priority Data
Mar. 31, 2015    (JP) ................. 2015-073600

(51) Int. Cl.
| | |
|---|---|
| *B29B 9/10* | (2006.01) |
| *B29C 48/00* | (2019.01) |
| *B29B 9/16* | (2006.01) |
| *C09J 201/00* | (2006.01) |
| *B29B 9/06* | (2006.01) |
| *C09J 7/30* | (2018.01) |
| *C08J 3/12* | (2006.01) |
| *C09J 7/00* | (2018.01) |
| *B29B 9/12* | (2006.01) |
| *B29B 13/06* | (2006.01) |
| *C09J 9/00* | (2006.01) |
| *C08K 7/00* | (2006.01) |
| *B29C 48/05* | (2019.01) |
| *B29C 48/04* | (2019.01) |
| *C09J 7/10* | (2018.01) |

(52) U.S. Cl.
CPC .................. *C09J 7/10* (2018.01); *B29B 9/065* (2013.01); *B29B 9/10* (2013.01); *B29B 9/12* (2013.01); *B29B 9/16* (2013.01); *B29B 13/065* (2013.01); *B29C 48/0022* (2019.02); *C08J 3/12* (2013.01); *C09J 7/30* (2018.01); *C09J 9/00* (2013.01); *C09J 201/00* (2013.01); *B29B 2009/163* (2013.01); *B29C 48/04* (2019.02); *B29C 48/05* (2019.02); *B29C 2793/0027* (2013.01); *C08K 7/00* (2013.01); *C09J 2205/102* (2013.01); *C09J 2205/30* (2013.01)

(58) Field of Classification Search
CPC .............................. B29B 9/065; B29B 13/065
See application file for complete search history.

(56) References Cited

U.S. PATENT DOCUMENTS

| | | | |
|---|---|---|---|
| 4,675,122 A | 6/1987 | Luers et al. | |
| 9,676,974 B2 * | 6/2017 | Hoshina | C09J 153/025 |
| 2009/0121372 A1 * | 5/2009 | Campbell | B29B 9/065 |
| | | | 264/5 |
| 2010/0093941 A1 * | 4/2010 | Akai | C08F 210/06 |
| | | | 525/240 |
| 2010/0124607 A1 | 5/2010 | Berti et al. | |
| 2013/0317193 A1 * | 11/2013 | Desai | B29B 9/16 |
| | | | 526/348.6 |
| 2014/0145374 A1 * | 5/2014 | Altonen | C08K 5/11 |
| | | | 264/328.14 |
| 2015/0344684 A1 | 12/2015 | Kusanose et al. | |
| 2016/0326412 A1 | 11/2016 | Hoshina et al. | |

FOREIGN PATENT DOCUMENTS

| | | | |
|---|---|---|---|
| EP | 0138203 A2 | | 4/1985 |
| JP | 06-073187 A | | 3/1994 |
| JP | 2000-52335 A | | 2/2000 |
| JP | 2000-136248 A | | 5/2000 |
| JP | 2002-293946 A | | 10/2002 |
| JP | 2002-371136 A | | 12/2002 |
| JP | 2007-126569 A | | 5/2007 |
| JP | 2007126569 A | * | 5/2007 |
| JP | 2011-245710 A | | 12/2011 |
| WO | 2014/002984 A1 | | 1/2014 |
| WO | 2015/098664 A1 | | 7/2015 |

* cited by examiner

Primary Examiner — Peter L Vajda
Assistant Examiner — S. Behrooz Ghorishi
(74) Attorney, Agent, or Firm — Norris McLaughlin, P.A.

(57) ABSTRACT

A method for manufacturing adhesive resin pellets includes adding an antiblocking agent to water, melting an adhesive resin and extruding the adhesive resin into the water, and cutting the adhesive resin extruded into the water to form adhesive resin pellets. Polyolefin fine particles used for the antiblocking agent have an average particle diameter of 1 µm or more and less than 18 µm, and the adhesive resin has an adhesive force of less than 15.00 N/25 mm.

5 Claims, No Drawings

ADHESIVE RESIN PELLETS AND METHOD OF MANUFACTURING SAME

TECHNICAL FIELD

The present invention relates to adhesive resin pellets having an excellent property of preventing blocking, and a method for manufacturing the same.

BACKGROUND ART

Conventionally, various measures have been taken in order to prevent blocking of adhesive resin pellets. Patent Literature 1 discloses a method for pelletizing a resin which easily causes blocking by dispersing pellets in a solution containing a lubricant and then removing moisture on surfaces of the pellets. Patent Literature 1 discloses a method using an inorganic powder lubricant or a metal soap such as a fatty acid amide as this lubricant. However, when an inorganic substance is used as the lubricant, contamination (trouble) of a T-die called gum easily occurs in a subsequent step of forming an adhesive sheet, and productivity may be lowered. In addition, the inorganic substance itself easily absorbs moisture. Therefore, if dehydration and drying of pellets is insufficient, foaming occurs due to an influence of moisture at the time of film formation. Furthermore, in long-term preservation, moisture-proof packing with aluminum bags or the like is often required in order to prevent moisture absorption. Meanwhile, Patent Literature 1 also discloses a method using a metal soap such as a fatty acid amide as an antiblocking agent. However, when adhesive pellets are prepared by this method, a lubricant bleeds out after an adhesive sheet is formed later. Therefore, an adverse effect such as reduction in adhesive force or contamination of an adherend is concerned.

Patent Literature 2 describes thermoplastic elastomer pellets having a polyolefin powder or the like attached to surfaces thereof. However, the attachment method described in Patent Literature 2 has the following problems. That is, in a case of a small particle diameter, the polyolefin powder or the like tends to fly. In a case of a large particle diameter, an efficiency is poor in terms of a contact probability between the thermoplastic elastomer pellets and the polyolefin powder or the like, and a non-covered area in which the polyolefin powder or the like does not cover the surfaces of the thermoplastic elastomer pellets becomes large to cause blocking. Furthermore, in a case of adhesive resin pellets having higher adhesiveness, used for an adhesive tape, a problem of occurrence of blocking still remains.

As described above, a method for completely preventing blocking of adhesive resin pellets used as an adhesive has not been found so far.

CITATION LIST

Patent Literature

Patent Literature 1: JP 2002-293946 A
Patent Literature 2: JP 2000-136248 A

SUMMARY OF INVENTION

Technical Problem

A problem to be solved by the present invention is to provide a means for preventing blocking of adhesive resin pellets used for an adhesive. Another problem to be solved is to provide a means for preventing blocking of adhesive resin pellets having higher adhesiveness, used for an adhesive tape. Still another problem to be solved is to provide a means for preventing contamination at the time of preparing an adhesive sheet and contamination of an adherend of the adhesive sheet.

Solution to Problem

As a result of studies to solve the above problems, the present inventors have found that in a method for manufacturing adhesive resin pellets manufactured by an underwater pelletizing method, the above problems can be solved by using polyolefin fine particles as an antiblocking agent added into the water, used in the underwater pelletizing method.

That is, a first aspect of the present invention provides a method for manufacturing adhesive resin pellets including an addition step of adding an antiblocking agent to water, an extrusion step of melting an adhesive resin and extruding the adhesive resin into the water, and a cutting step of cutting the adhesive resin extruded into the water to form adhesive resin pellets after the extrusion step, characterized in that polyolefin fine particles are used for the antiblocking agent, the polyolefin fine particles have an average particle diameter of 1 μm or more and less than 18 μm, and the adhesive resin has an adhesive force of less than 15 N/25 mm. A second aspect of the present invention provides the method for manufacturing adhesive resin pellets according to the first aspect, characterized in that the adhesive resin has a holding force of 0.5 mm or less.

A third aspect of the present invention provides the method for manufacturing adhesive resin pellets according to the first or second aspect, characterized by including a dehydration and drying step of dehydrating and drying the adhesive resin pellets after the cutting step, and an attachment step of attaching the antiblocking agent to the dehydrated and dried adhesive resin pellets after the dehydration and drying step.

A fourth aspect of the present invention provides the method for manufacturing adhesive resin pellets according to any one of the first to third aspects, characterized in that the polyolefin fine particles are compatible with the adhesive resin.

A fifth aspect of the present invention provides the method for manufacturing adhesive resin pellets according to any one of the first to fourth aspects, characterized in that the adhesive resin pellets with the antiblocking agent attached thereto have an average particle diameter of 2 to 10 mm.

A sixth aspect of the present invention provides fine particles-attached adhesive resin pellets having fine particles attached to surfaces thereof, in which the fine particles are thermoplastic polyolefin fine particles, the fine particles have an average particle diameter of less than 18 μm, the adhesive resin pellets are formed of an adhesive resin, and the adhesive resin has an adhesive force of less than 15.00 N/25 mm. A seventh aspect of the present invention provides the fine particles-attached adhesive resin pellets according to the sixth aspect, characterized in that the adhesive resin has a holding force of 0.5 mm or less.

An eighth aspect of the present invention provides the fine particles-attached adhesive resin pellets according to the sixth or seventh aspect, characterized in that the average attachment amount of the fine particles to the adhesive resin pellets is from 0.1 to 5.0% by weight based on the weight of the fine particles-attached adhesive resin pellets.

A ninth aspect of the present invention provides the fine particles-attached adhesive resin pellets according to any one of the sixth to eighth aspects, characterized in that the fine particles are compatible with the adhesive resin.

A tenth aspect of the present invention provides the fine particles-attached adhesive resin pellets according to any one of the sixth to ninth aspects, characterized in that an adhesive sheet formed into a thickness of 10 μm on a substrate by melting the fine particles-attached adhesive resin pellets has an adhesive force of 1.00 to 15.00 N/25 mm with respect to a BASUS plate as an adherend, and the adhesive sheet has a probe tack value of 0.5 to 7.5 N/5 mmφ.

An eleventh aspect of the present invention provides the fine particles-attached adhesive resin pellets according to any one of the sixth to tenth aspects, characterized in that the fine particles-attached adhesive resin pellets have an average particle diameter of 2 to 10 mm.

Advantageous Effects of Invention

According to the present invention, blocking of adhesive resin pellets having high adhesiveness can be prevented. Furthermore, contamination at the time of preparing an adhesive sheet and contamination of an adherend of the adhesive sheet can be prevented.

DESCRIPTION OF EMBODIMENTS

Hereinafter, description will be given in the following order by indicating specific examples of the present invention. However, the present invention is not limited only to the following examples.
1. Underwater pelletizing method
2. Raw materials of the present invention
3. Method of the present invention
4. Product of the present invention
<<Underwater Pelletizing Method>>

For example, as disclosed in JP 2011-245710 A, the underwater pelletizing method in the present invention is a method for manufacturing adhesive resin pellets by cutting an adhesive resin melt-extruded from an extruder into pellets with an underwater cutting type granulator. That is, the underwater pelletizing method is a method for manufacturing adhesive resin pellets, including an extrusion step of melting an adhesive resin and extruding the adhesive resin into water, and a cutting step of cutting the adhesive resin extruded into the water in the water to form adhesive resin pellets after the extrusion step. The present invention includes an addition step of adding an antiblocking agent to the water, and is characterized in that polyolefin fine particles are used for the antiblocking agent.

When an antiblocking agent is attached to surfaces of adhesive resin pellets to cover the surfaces, and a non-covered area thereby becomes smaller, adhesive non-covered surfaces are not in contact with each other. Therefore, blocking of the adhesive resin pellets can be prevented. In the method for manufacturing adhesive resin pellets according to the present invention, an antiblocking agent is attached to adhesive resin pellets by the underwater pelletizing method, and therefore the antiblocking agent is attached thereto in the water. Therefore, the antiblocking agent can be uniformly attached to surfaces of the adhesive resin pellets to reduce the non-covered area.

In addition, the present invention may include a dehydration and drying step of dehydrating and drying the adhesive resin pellets after the cutting step. Furthermore, the present invention may include an attachment step of attaching an antiblocking agent to the dehydrated and dried adhesive resin pellets after the dehydration and drying step.

<<Raw Materials of the Present Invention>>
<Adhesive Resin (Adhesive)>

The adhesive resin in the present invention is not particularly limited as long as being a soft and adhesive resin at room temperature. A tackifying component such as a tackifying resin or a softener may be added to a resin having no or insufficient adhesiveness to obtain an adhesive resin. An adhesive resin used in the method for manufacturing adhesive resin pellets and the fine particles-attached adhesive resin pellets according to the present invention is not particularly limited as long as being able to be melt-extruded. However, an adhesive resin formed of a polyolefin copolymer or a styrene elastomer adhesive resin is preferable, and an amorphous polyolefin adhesive resin or a hydrogenated styrene elastomer adhesive resin is more preferable. As the adhesive resin formed of a polyolefin copolymer, an ethylene propylene rubber (EPR), an ethylene butadiene rubber (EBR), an ethylene vinyl acetate copolymer (EVA), an olefin crystal-ethylene/butylene-olefin crystal block copolymer (CEBC), an amorphous polypropylene, or the like may be used. As the styrene elastomer, a styrene-isoprene-styrene block copolymer (SIS), a styrene-ethylene/propylene-styrene block copolymer (SEPS), a styrene-isobutylene-styrene block copolymer (SIBS), a styrene-ethylene/butylene-styrene block copolymer (SEBS), a styrene butadiene rubber (SBR), a hydrogenated styrene butadiene rubber (HSBR), or the like may be used. In addition, a mixture of a polyolefin adhesive resin and a styrene elastomer adhesive resin may be used. Furthermore, a known tackifying resin, softener, antiaging agent, filler, or the like may be appropriately added to the adhesive resin.

According to the present invention, blocking of adhesive resin pellets having high adhesiveness can be prevented. Adhesiveness of an adhesive resin used in the present invention, that is, an adhesive property thereof is evaluated by melting the adhesive resin to prepare an adhesive sheet and measuring an adhesive force, a probe tack, and a holding force thereof. The adhesive sheet has an adhesive resin layer thickness of 10 μm and a substrate layer (polypropylene) thickness of 40 μm. An adhesive sheet sample is prepared by subjecting the adhesive resin layer and the substrate layer to resin melting co-extrusion. Specifically, using a T-die extruder of 30 mmφ, this adhesive resin is formed into a film by resin melting co-extrusion together with a substrate layer resin containing a polypropylene resin of MFR of 2 g/10 min (conditions of 230° C. and 2.16 kg in JIS K 7210: 1999) at a T-die temperature of 230° C. and a film take-up rate of 5 m/min, a titanium oxide master batch, and an antioxidant to prepare an adhesive sheet sample having a substrate thickness of 40 μm and an adhesive layer thickness of 10 μm.

Adhesive Force

For an adhesive force of an adhesive sheet sample, a 180° peeling force is measured by a method in accordance with JIS Z 0237 2000. An adhesive sheet sample having a width of 25 mm is pasted on a BASUS plate, and is pressed one time back and forth with a 1 kg pressure roller. Thereafter, the adhesive sheet sample is allowed to stand for five minutes, and then a 180° peeling force is measured at a pulling rate of 0.3 m/min. Even in an adhesive resin having high adhesiveness, having an adhesive force of 5.00 N/25 mm or more, used for an adhesive tape, blocking can be prevented because an antiblocking agent is uniformly attached thereto in water according to the present invention. In addition, as for an adhesive force of the adhesive resin according to the present invention, an adhesive force of an adhesive sheet sample is less than 15.00 N/25 mm with respect to a BASUS plate as an adherend. In a case of 15.00 N/25 mm or more, non-covered surfaces easily cause blocking. Therefore, a poor blocking property is obtained also by the method for manufacturing adhesive resin pellets according to the present invention. In order to prevent blocking of adhesive resin pellets, the adhesive force of the adhesive sheet sample is preferably from 1.00 to 10.00 N/25 mm with respect to a BASUS plate as an adherend. The adhesive force is more preferably from 1.00 to 9.00 N/25 mm, and still more preferably from 1.00 to 8.00 N/25 mm.

Probe Tack

A probe tack of an adhesive sheet sample is measured by a method in accordance with ASTM D 2979 using an NS probe tack tester (manufactured by Nichiban Co., Ltd.) under conditions of a columnar probe diameter of 5 mm, a pressing pressure of 100 gf/cm$^2$, contact time of one second, and a peeling rate of 10 mm/sec. Non-covered surfaces easily cause blocking. Therefore, a probe tack value of the adhesive sheet sample is preferably from 0.5 to 7.5 N/5 mmφ. The probe tack value is more preferably from 0.5 to 6.5 N/5 mmφ), and still more preferably from 0.5 to 6.0 N/5 mmφ.

Holding Force

A holding force of an adhesive sheet sample is measured by a method in accordance with JIS Z 0237 2000. The adhesive sheet sample is pasted on a glass plate such that a pasted area is 12 mm×20 mm, and is pressed one time back and forth with a 2 kg pressure roller. Thereafter, the adhesive sheet sample is allowed to stand for 20 minutes, and a load of 1 kg is applied thereto, and a deviation after one hour is measured. The holding force (easiness of deviation) of the adhesive sheet sample indicates easiness of deformation of an adhesive resin. In a case where the adhesive resin is easily deformed, adhesive resin pellets manufactured using this resin are also easily deformed. Therefore, even when the adhesive resin pellets are covered with fine particles, blocking easily occurs because of generation of a non-covered surface and increase in a non-covered area due to weighting and change with time. Therefore, the holding force of the adhesive sheet sample is preferably 0.5 mm or less, more preferably 0.3 mm or less, and still more preferably 0.1 mm or less.

<Antiblocking Agent>

Polyolefin fine particles are used as the antiblocking agent in the present invention. Polyolefin fine particles used in the present invention are not particularly limited, but polypropylene fine particles and polyethylene fine particles are preferable, and polypropylene fine particles are particularly preferable. In addition, thermoplastic polyolefin fine particles are preferable.

Regarding an average particle diameter of polyolefin fine particles, when the particle diameter is large, an efficiency is poor in terms of a contact probability with adhesive resin pellets in water, dispersibility is also poor, and therefore a covering property of the adhesive resin pellets is poor. In addition, polyolefin fine particles easily fall off due to an influence of a water flow or the like in the water. For these reasons, the average particle diameter is preferably less than 18 μm, more preferably less than 15 μm, and still more preferably less than 12 μm. In addition, the average particle diameter is preferably 1 μm or more, more preferably 3 μm or more, and still more preferably 5 μm or more because a too small particle diameter makes handling difficult during working, and it is necessary to increase the contact probability in order to reduce the non-covered area. The average particle diameter referred to in the present invention is a number average particle diameter, and can be measured by observation using SEM, for example. Examples of commercially available polyolefin fine particles include Ceridust (registered trademark) of Clariant.

The polyolefin fine particles are present in an adhesive in a final form, and therefore preferably have compatibility with the adhesive resin. Here, compatibility means a property that two or more kinds of substances have affinity to each other and form a solution or an admixture.

<<Method for Manufacturing Adhesive Resin Pellets According to the Present Invention>>

A method for manufacturing adhesive resin pellets according to the present invention includes an addition step of adding an antiblocking agent to water, an extrusion step of melting an adhesive resin and extruding the adhesive resin into the water, and a cutting step of cutting the adhesive resin extruded into the water to form adhesive resin pellets after the extrusion step. The method is characterized in that polyolefin fine particles are used for the antiblocking agent. Each of the steps will be described below.

<Addition Step>

The addition step is a step of adding polyolefin fine particles as an antiblocking agent to water. As an addition method, a known method can be used without any limitation. This water is preferably circulating water.

The addition amount of the polyolefin fine particles in water is preferably from 0.1 to 5.0% by weight, more preferably from 0.5 to 3.5% by weight, and still more preferably from 0.5 to 3.0% by weight based on the weight of water or circulating water. Adhesive resin pellets for preventing blocking can be manufactured by setting the addition amount within this range.

<Extrusion Step>

The extrusion step is a step of melting an adhesive resin and extruding the adhesive resin into water as described above. As a melting method and an extrusion method, known methods can be used without any limitation. For example, there is a method for melt-kneading an adhesive resin in a twin screw extruder and melt extruding the adhesive resin from the twin screw extruder into water.

<Cutting Step>

As described above, the cutting step is a step of cutting an adhesive resin melt-extruded into water to form adhesive resin pellets after the extrusion step. As a cutting method, a known method can be used without any limitation. For example, there is a method using an underwater cutting granulator.

<Dehydration and Drying Step and Attachment Step (Post-Addition)>

The method for manufacturing adhesive resin pellets according to the present invention may include a dehydration and drying step of dehydrating and drying adhesive resin pellets manufactured by an underwater pelletizing method, and an attachment step of attaching an antiblocking agent as post-addition after dehydrating and drying. Furthermore, after dehydration, drying may be performed after an antiblocking agent is attached.

As a dehydration and drying method, a known method can be used without any limitation. For example, a centrifugal dehydrator can be used.

As the attachment step, a known method can be used without any limitation. For example, adhesive resin pellets may be uniformly coated with polyolefin fine particles using a feeder. The post-addition amount of the polyolefin fine particles is preferably from 0.1 to 4.9% by weight, more preferably from 0.1 to 3.0% by weight, and still more preferably from 0.1 to 2.0% by weight based on the weight of the adhesive resin pellets.

<Selection Step>

The method for manufacturing adhesive resin pellets according to the present invention may include a selection step of selecting adhesive resin pellets to which an antiblocking agent is not attached from among manufactured adhesive resin pellets. For selection, a known method can be used without any limitation. For example, a sorter can be used.

<Drying Step>

The method for manufacturing adhesive resin pellets according to the present invention may include a drying step of drying the manufactured adhesive resin pellets.

For drying, a known method can be used without any limitation. A drying temperature is preferably from 20 to 80° C., and drying time is preferably from 0.1 to 24 hours. The drying temperature and drying time are adjusted within a range in which the adhesive resin pellets do not cause blocking.

<Total Addition Amount of Polyolefin Fine Particles>

The total addition amount of polyolefin fine particles attached to adhesive resin pellets during underwater pelletizing and polyolefin fine particles post-added is preferably from 0.1 to 5.0% by weight, more preferably from 0.5 to 3.5% by weight, and still more preferably from 0.5 to 3.0% by weight based on the weight of the adhesive resin pellets. By setting the total addition amount within this range, adhesive resin pellets for preventing blocking can be manufactured.

<<Product of the Present Invention>>

Adhesive resin pellets to which an antiblocking agent is attached are manufactured by the manufacturing method according to the present invention. That is, fine particles-attached adhesive resin pellets having fine particles which are polyolefin fine particles attached to surfaces thereof are manufactured. In order to prevent blocking, entire surfaces of the adhesive resin pellets are preferably substantially covered with the fine particles.

<Fine Particles-Attached Adhesive Resin Pellets>

The fine particles of the fine particles-attached adhesive resin pellets are thermoplastic polyolefin fine particles. An average particle diameter of the fine particles is preferably less than 18 µm, more preferably less than 15 µm, and still more preferably less than 12 µm because a covering property of the adhesive resin pellets is poor when the particle diameter is large. In addition, the average particle diameter is preferably 1 µm or more, more preferably 3 µm or more, and still more preferably 5 µm or more because a too small particle diameter makes handling difficult during working. The average particle diameter referred to in the present invention is a number average particle diameter, and can be measured by observation using SEM, for example.

From a viewpoint of the attachment amount of the fine particles to the adhesive resin pellets, in order to enhance the antiblocking effect, the average attachment amount of the fine particles to the adhesive resin pellets is preferably from 0.1 to 5.0% by weight, more preferably from 0.5 to 3.5% by weight, and still more preferably from 0.5 to 3.0% by weight based on the weight of the fine particles-attached adhesive resin pellets. The average attachment amount can be measured by gravimetric measurement before and after attachment.

<Evaluation and Measurement Method>

(Blocking Property)

25 kg of the adhesive resin pellets manufactured by the manufacturing method according to the present invention or the fine particles-attached adhesive resin pellets according to the present invention is put in a plastic bag of 800 mm×900 mm and is packed in a box having a length of 620 mm×a width of 600 mm×a height of 230 mm. After one month at 40° C., a blocking state of the adhesive resin pellets is observed.

(Evaluation and Measurement of Adhesive Sheet)

The adhesive resin pellets manufactured by the manufacturing method according to the present invention or the fine particles-attached adhesive resin pellets according to the present invention are melted to prepare an adhesive sheet. An extruded state, adhesive properties (an adhesive force, a probe tack, and a holding force), and an adherend contamination property are evaluated and measured. The adhesive sheet has an adhesive layer thickness of 10 µm and a substrate layer (polypropylene) thickness of 40 µm. An adhesive sheet sample is prepared by subjecting the adhesive layer and the substrate layer to resin melting co-extrusion. Specifically, using a T-die extruder of 30 mmφ, the adhesive resin pellets manufactured by the manufacturing method according to the present invention or the fine particles-attached adhesive resin pellets according to the present invention are formed into a film by resin melting co-extrusion together with a substrate layer resin containing a polypropylene resin of MFR of 2 g/10 min (conditions of 230° C. and 2.16 kg in JIS K 7210: 1999) at a T-die temperature of 230° C. and a film take-up rate of 5 m/min, a titanium oxide master batch, and an antioxidant to prepare an adhesive sheet sample having a substrate thickness of 40 µm and an adhesive layer thickness of 10 µm.

Extruded State

For an extruded state of the adhesive resin pellets manufactured by the manufacturing method according to the present invention or the fine particles-attached adhesive resin pellets according to the present invention at the time of preparing an adhesive sheet, appearance of an extruded adhesive sheet sample including an adhesive layer is visually checked.

Adhesive Force

For an adhesive force of an adhesive sheet sample, a 180° peeling force is measured by a method in accordance with JIS Z 0237 2000. An adhesive sheet sample having a width of 25 mm is pasted on a BASUS plate, and is pressed one time back and forth with a 1 kg pressure roller. Thereafter, the adhesive sheet sample is allowed to stand for five minutes, and then a 180° peeling force is measured at a pulling rate of 0.3 m/min.

In a case where an adhesive sheet sample has a high adhesive force, non-covered surfaces of the adhesive resin pellets manufactured by the manufacturing method according to the present invention or the fine particles-attached adhesive resin pellets according to the present invention easily cause blocking. Therefore, an adhesive sheet sample preferably has an adhesive force of 1.00 to 15.00 N/25 mm with respect to a BASUS plate as an adherend. The adhesive force is more preferably from 1.00 to 10.00 N/25 mm, still more preferably from 1.00 to 9.00 N/25 mm, and particularly preferably from 1.00 to 8.00 N/25 mm.

Probe Tack

A probe tack of an adhesive sheet sample is measured by a method in accordance with ASTM D 2979 using an NS probe tack tester (manufactured by Nichiban Co., Ltd.) under conditions of a columnar probe diameter of 5 mm, a pressing pressure of 100 gf/cm², contact time of one second, and a peeling rate of 10 mm/sec.

Non-covered surfaces of the adhesive resin pellets manufactured by the manufacturing method according to the present invention or the fine particles-attached adhesive resin pellets according to the present invention easily cause blocking. Therefore, an adhesive sheet sample preferably has a probe tack value of 0.5 to 7.5 N/5 mmφ. The probe tack value is more preferably from 0.5 to 6.5 N/5 mmφ, and still more preferably from 0.5 to 6.0 N/5 mmφ.

Holding Force

A holding force of an adhesive sheet sample is measured by a method in accordance with JIS Z 0237 2000. The adhesive sheet sample is pasted on a glass plate such that a pasted area is 12 mm×20 mm, and is pressed one time back and forth with a 2 kg pressure roller. Thereafter, the adhesive sheet sample is allowed to stand for 20 minutes, and a load of 1 kg is applied thereto, and a deviation after one hour is measured.

A holding force of an adhesive sheet sample indicates easiness of deformation of the adhesive resin pellets manufactured by the manufacturing method according to the present invention or the fine particles-attached adhesive resin pellets according to the present invention. Easily deformed adhesive resin pellets generate a non-covered surface and a non-covered area is increased due to weighting and change with time. Therefore, the holding force of an adhesive sheet sample is preferably 0.5 mm or less, more preferably 0.3 mm or less, and still more preferably 0.1 mm or less.

Adherend Contamination Property

An adhesive sheet sample having a width of 25 mm is pasted on a BASUS plate with bubbles at several positions therein, is heated at 80° C. for 24 hours, and then is removed. The adhesive sheet sample is allowed to stand at room temperature. Thereafter, the adhesive sheet is peeled off, and is visually checked for presence of contamination.

EXAMPLES

Hereinafter, Examples of the present invention will be specifically described, but the present invention is not limited to these Examples.

<<Manufacturing Method in Examples and Comparative Examples>>

<Raw Materials>

[Adhesive Resin (Adhesive)]

Adhesives used in Examples and Comparative Examples are as follows, and all of the following adhesives are obtained by mixing a polyolefin adhesive and a styrene elastomer adhesive. An adhesive sheet was prepared from the following adhesives, and an adhesive force, a probe tack, and a holding force thereof were measured. Results are indicated below. The adhesive force, the probe tack, and the holding force were measured by preparing an adhesive sheet sample by melting co-extrusion of the adhesive layer and the substrate layer as described above. Using a T-die extruder of 30 mmφ, each of the following adhesives was formed into a film by resin melting co-extrusion together with a substrate layer resin containing a polypropylene resin of MFR of 2 g/10 min (conditions of 230° C. and 2.16 kg in JIS K 7210: 1999) at a T-die temperature of 230° C. and a film take-up rate of 5 m/min, a titanium oxide master batch, and an antioxidant to prepare an adhesive sheet having a substrate thickness of 40 μm and an adhesive layer thickness of 10 μm.

Adhesive A: adhesive force 5.10 N/25 mm, probe tack 1.36 N/5 mmφ), holding force 0.1 mm Adhesive B (weak adhesion): adhesive force 1.47 N/25 mm, probe tack 2.45 N/5 mmφ), holding force 0.1 mm Adhesive C (strong adhesion): adhesive force 15.24 N/25 mm, probe tack 6.65 N/5 mmφ, holding force 0.9 mm

[Fine Particles]

Fine particles used in Examples and Comparative Examples are as follows.

(Polyolefin Fine Particles (PP Powder))

Ceridust 6050M manufactured by Clariant (number average particle diameter 9 μm)

Viscol 660-P (number average particle diameter 120 μm) manufactured by Sanyo Chemical Industries, Ltd.

(Other Fine Particles)

Talc: Micro Ace K1 (number average particle diameter 8 μm) manufactured by Nippon Talc Co., Ltd.

Erucamide: Diamid L-200 (number average particle diameter: 500 μm) manufactured by Nippon Kasei Chemical Co., Ltd.

<Manufacturing Method (Underwater Pelletizing)>

An adhesive was melt-extruded into water from a die hole of 5 mmφ, and was cut with an underwater cut pelletizer installed in the die. The cut pellets were conveyed with circulating water to which fine particles had been added under conditions described in Table 1, and then were dehydrated with a centrifugal dehydrator. Furthermore, when additional fine particles were post-added, the pellets coming out of the dehydrator were coated with the fine particles with a feeder, and then mixing was performed such that the fine particles were uniformly attached to the pellets. Thereafter, the pellets were dried at 50° C. for two hours to prepare adhesive resin pellets.

<<Evaluation and Measurement Method>>

For each of Examples and Comparative Examples described below, a blocking property and an extruded state of adhesive resin pellets, an adhesive force, a probe tack, and a holding force of an adhesive sheet, and an adherend contamination property were evaluated and measured by the above evaluation and measurement method. Using a T-die extruder of 30 mmφ, the above adhesive resin pellets were formed into a film by resin melting co-extrusion together with a substrate layer resin containing a polypropylene resin of MFR of 2 g/10 min (conditions of 230° C. and 2.16 kg in JIS K 7210: 1999) at a T-die temperature of 230° C. and a film take-up rate of 5 m/min, a titanium oxide master batch, and an antioxidant to prepare an adhesive sheet having a substrate thickness of 40 μm and an adhesive layer thickness of 10 μm.

<<Manufacturing Methods and Results of Examples 1 to 4 and Comparative Examples 1 to 5>>

Manufacturing methods and results of Examples 1 to 4 and Comparative Examples 1 to 5 are indicated below and in Table 1.

Example 1

To adhesive A, 0.5 wt % polyolefin fine particles (Ceridust 6050M manufactured by Clariant) were added in circulating water, and pellets were dehydrated. Thereafter, 1.0 wt % polyolefin fine particles were uniformly post-added with a feeder. A blocking property and an extruded state of the adhesive pellets were all good. Furthermore, as described above, an adhesive sheet (total thickness 50 μm (adhesive layer thickness 10 μm)) was prepared using these adhesive resin pellets. An adhesive force, a probe tack, and a holding force (hereinafter, referred to as adhesive properties), and an adherend contamination property were evaluated. There was no problem in the adhesive properties of the adhesive sheet and the adherend contamination property.

Example 2

To adhesive A, 0.5 wt % polyolefin fine particles (Ceridust 6050M manufactured by Clariant, number average particle diameter: 9 μm) were added in circulating water, and adhesive resin pellets were dehydrated. Thereafter, 0.5 wt % polyolefin fine particles were uniformly post-added with a feeder. A blocking property and an extruded state of the adhesive resin pellets were all good. Furthermore, as described above, an adhesive sheet (total thickness 50 μm (adhesive layer thickness 10 μm)) was prepared using these adhesive resin pellets. Adhesive properties and an adherend contamination property were evaluated. There was no problem in the adhesive properties of the adhesive sheet and the adherend contamination property.

Example 3

To adhesive A, 0.5 wt % polyolefin fine particles (Ceridust 6050M manufactured by Clariant) were added in circulating water, and adhesive resin pellets were dehydrated. Thereafter, 3.0 wt % polyolefin fine particles were uniformly post-added with a feeder. A blocking property and an extruded state of the adhesive resin pellets were all good. Furthermore, as described above, an adhesive sheet (total thickness 50 μm (adhesive layer thickness 10 μm)) was prepared using these adhesive resin pellets. Adhesive properties and an adherend contamination property were evaluated. There was no problem in the adhesive properties of the adhesive sheet and the adherend contamination property.

Example 4

To adhesive B (weak adhesion), 0.5 wt % polyolefin fine particles (Ceridust 6050M manufactured by Clariant) were added in circulating water. The polyolefin fine particles were not post-added. A blocking property and an extruded state of the adhesive resin pellets were all good. Furthermore, as described above, an adhesive sheet (total thickness 50 μm (adhesive layer thickness 10 μm)) was prepared using these adhesive resin pellets. Adhesive properties and an adherend contamination property were evaluated. There was no problem in the adhesive properties of the adhesive sheet and the adherend contamination property.

Comparative Example 1

Preparation, evaluation and measurement were performed in accordance with Example 3 except that Viscol 660-P (number average particle diameter 120 μm) manufactured by Sanyo Chemical Industries, Ltd. was added as polyolefin fine particles in circulating water. The adhesive resin pellets caused blocking.

Comparative Example 2

Preparation, evaluation and measurement were performed in accordance with Example 2 except that talc (Micro Ace K1, manufactured by Nippon Talc Co., Ltd., number average particle diameter 8 μm) was used in place of the polyolefin fine particles, and the post-addition amount of talc was increased to 5.0 wt %. A blocking property was good, but gum was generated during extrusion.

Comparative Example 3

Preparation, evaluation and measurement were performed in accordance with Example 3 except that erucamide (Diamid L-200, manufactured by Nippon Kasei Chemical Co., Ltd.) was used in place of the polyolefin fine particles. During extrusion, slippage occurred at a screw entrance, and the pressure was not uniform. Contamination was also observed.

Comparative Example 4

To adhesive A, 3.5 wt % polyolefin fine particles (Ceridust 6050M manufactured by Clariant) were uniformly post-added with a feeder. The polyolefin fine particles were not added in circulating water. In the dehydration and drying step, adhesive pellets caused blocking and were stuck to each other.

Comparative Example 5

Preparation, evaluation and measurement were performed in accordance with Example 3 except that adhesive C (strong adhesion) was used in place of adhesive A. Pellets had a poor blocking property. Deformation of the pellets was also observed.

TABLE 1

| | | Example 1 | Example 2 | Example 3 | Example 4 | Comparative Example 1 | Comparative Example 3 | Comparative Example 4 | Comparative Example 5 | Comparative Example 6 |
|---|---|---|---|---|---|---|---|---|---|---|
| Adhesive | | A | A | A | B | A | A | A | A | C |
| Antiblocking agent | | PP powder Ceridust 6050M (Clariant) | PP powder Ceridust 6050M (Clariant) | PP powder Ceridust 6050M (Clariant) | PP powder Ceridust 6050M (Clariant) | PP powder Viscol 660-P (Sanyo Chemical Industries, Ltd.) | Talc Micro Ace K1 (Nippon Talc Co., Ltd.) | Erucamide Diamid L-200 (Nippon Kasei Chemical Co., Ltd.) | PP powder Ceridust 6050M (Clariant) | PP powder Ceridust 6050M (Clariant) |
| Addition amount | Water tank (%) | 0.5 | 0.5 | 0.5 | 0.5 | 0.5 | 0.5 | 0.5 | 0 | 0.5 |
| | Post-addition (%) | 1 | 0.5 | 3 | 0 | 3 | 5 | 3 | 3.5 | 3 |

TABLE 1-continued

| | Example 1 | Example 2 | Example 3 | Example 4 | Comparative Example 1 | Comparative Example 3 | Comparative Example 4 | Comparative Example 5 | Comparative Example 6 |
|---|---|---|---|---|---|---|---|---|---|
| Number average particle diameter (μm) (catalog value) | 9 | 9 | 9 | 9 | 120 | 8 | 500 | 9 | 9 |
| Adhesive pellets blocking property | No abnormality observed | No abnormality observed | No abnormality observed | No abnormality observed | Blocking | No abnormality observed | No abnormality observed | Blocking in dehydrator | Deformed blocking |
| Extrusion property | No abnormality observed | No abnormality observed | No abnormality observed | No abnormality observed | Not capable of being extruded | Gum was generated in the middle of extrusion, extrusion was stopped, and a die was cleaned. | Slippage occurred at a screw entrance of a hopper, and the pressue was not uniform. | — | — |
| Adhesive properties Adhesive force (N/25 mm) | 5.10 | 5.25 | 5.00 | 1.47 | — | 5.50 | — | — | 15.24 |
| Probe tack (N/5 mmϕ) | 1.36 | 1.40 | 1.31 | 1.36 | — | 1.20 | — | — | 9.65 |
| Holding force | 0.1 | 0.1 | 0.1 | 0.1 | — | 0.1 | — | — | 0.9 |
| Adherend contamination property | No abnormality observed | No abnormality observed | No abnormality observed | No abnormality observed | — | No abnormality observed | Contaminated | — | — |
| Total evaluation | ○ | ○ | ○ | ○ | x | x | x | x | x |

The invention claimed is:

1. A method for manufacturing adhesive resin pellets, comprising:
   melting an adhesive resin and extruding the adhesive resin into water;
   then cutting the adhesive resin while underwater to form adhesive resin pellets;
   then conveying the adhesive resin pellets in circulating water containing an antiblocking agent, thereby applying the antiblocking agent to surfaces of the adhesive resin pellets; and
   then removing from the circulating water the adhesive resin pellets to which the antiblocking agent has been applied and directly dehydrating and drying the adhesive resin pellets to which the antiblocking agent has been applied, wherein
   the antiblocking agent comprises polyolefin fine particles,
   the polyolefin fine particles have an average particle diameter of 1 μm or more and less than 18 μm, and
   the adhesive resin has an adhesive force of less than 15.00 N/25 mm.

2. The method for manufacturing adhesive resin pellets according to claim 1, wherein the adhesive resin has a holding force of 0.5 mm or less wherein "holding force" is determined by JIS Z 0237 2000 in which a 12 mm by 20 mm area of an adhesive sheet, made by coextruding the adhesive resin pellets with a polypropylene resin for a substrate to produce the adhesive sheet consisting of a film of the adhesive resin on a polypropylene substrate, is adhered to a glass plate by being pressed therein by a back-and-forth pass of a 2 kg pressure roller, then allowed to stand for 20 minutes and then a 1 kg load is applied to the adhesive sheet and distance the adhesive sheet has been displaced is measured and expressed as the "holding force".

3. The method for manufacturing adhesive resin pellets according to claim 1, wherein the polypropylene fine particles have affinity to the adhesive resin.

4. The method for manufacturing adhesive resin pellets according to claim 1, wherein the adhesive resin pellets have an average particle diameter of 2 to 10 mm.

5. The method for manufacturing adhesive resin pellets according to claim 1, wherein the adhesive resin comprises a mixture of a polyolefin adhesive and a styrene elastomer adhesive.

* * * * *